United States Patent [19]

Katz et al.

[11] Patent Number: 5,399,434
[45] Date of Patent: Mar. 21, 1995

[54] HIGH TEMPERATURE POLYIMIDE-FLUOROPOLYMER LAMINAR STRUCTURE

[75] Inventors: Morton Katz, Columbus; Philip R. LaCourt, Chillicothe, both of Ohio

[73] Assignee: E. I. du Pont de Nemours and Company, Wilmington, Del.

[21] Appl. No.: 170,842

[22] Filed: Dec. 21, 1993

[51] Int. Cl.6 .................. B32B 27/08; H01B 3/44
[52] U.S. Cl. ...................... 428/421; 174/121 SR; 174/120 SR; 174/110 FC
[58] Field of Search .................. 428/421, 422; 174/121 SR, 120 SR, 110 FC

[56] References Cited

U.S. PATENT DOCUMENTS

| | | |
|---|---|---|
| 3,616,177 | 10/1971 | Gumerman . |
| 5,106,673 | 5/1992 | Effenberger et al. . |
| 5,238,748 | 8/1993 | Effenberger et al. ............... 428/421 |
| 5,240,775 | 8/1993 | Tannenbaum ........................ 428/422 |
| 5,250,356 | 10/1993 | Batyar .................................. 428/421 |

*Primary Examiner*—James C. Cannon

[57] ABSTRACT

Laminar structures having a polyimide core layer, inner fluorinated ethylenepropylene copolymer (FEP) layers, intermediate polytetrafluoroethylene homopolymer (PTFE) and fluorinated ethylenepropylene copolymer (FEP) blend layers and outer fluorinated ethylenepropylene copolymer (FEP) layers for use in the form of narrow tapes as an insulating wire or cable wrap.

17 Claims, No Drawings

HIGH TEMPERATURE POLYIMIDE-FLUOROPOLYMER LAMINAR STRUCTURE

FIELD OF THE INVENTION

The present invention relates to laminar structures having a polyimide core layer, inner fluorinated ethylene-propylene (FEP) copolymer layers, intermediate polytetrafluoroethylene (PTFE)/fluorinated ethylenepropylene (FEP) copolymer blend layers and outer fluorinated ethylenepropylene (FEP) copolymer layers, which can be used in the form of narrow tapes as an insulating wire wrap.

BACKGROUND OF THE INVENTION

Laminar structures of polyimides and fluorinated polymers, such as laminates of Kapton® polyimide film and fluorinated ethylenepropylene copolymers (FEP), are commercially available and are characterized by a unique combination of physical properties not separately possessed by each individual component. An important use of such laminar structures is as an insulation wrap for electrical conductors. However, a drawback of such laminar structures resides in the lack of sufficient bond strength and durability when exposed to high temperature environments. In addition, when such laminar structures are heat-sealed onto metal conductors, they cannot be readily removed or stripped from the conductor. In many end-uses, it is important that the insulation be readily strippable from the end of the metal conductor without damaging the conductor by nicking or scoring. The spirally wound insulation wrap, usually applied to the conductor in film or tape form and heat-sealed thereon, experiences some degree of shrinkage during the heat-sealing step and is quite difficult to remove. Both conventional polyimide/FEP and FEP/polyimide/FEP insulation tapes have poor strippability from the conductor since, in the case of polyimide against the metal, the coefficient of friction is high; and in the case of FEP against the metal, the FEP tends to bond to the metal surface during the heat-sealing step.

Moreover, while laminar structures containing polyimide have a very desirable balance of properties, such as high temperature and electrical properties, under some conditions, polyimide-containing structures can arc track, resulting in the undesirable formation of a carbonaceous char. Arc tracking is a catastrophic failure in the presence of an electrical arc when a short circuit occurs between the conductor and a conducting medium external to the insulation, such as a moderately conductive fluid. Such a failure causes mechanical damage to the insulation which rapidly propagates at the elevated temperature of the electrical arc.

U.S. Pat. No. 3,616,177, issued on Oct. 26, 1971, discloses an asymmetric, four-layer laminar structure, for use as an insulation wrapping for wire and cable, comprising a polyimide base layer, inner layers of FEP copolymer adhered to both sides of the polyimide base layer and an outer layer of a blend of PTFE and FEP adhered to one of the FEP inner layers. The laminar structures exhibit superior bond strength retention under conditions of high temperature and high humidity and are easily strippable from the electrical conductor. The single outer PTFE/FEP layer is located next to the conductor and provides the requisite strippability, whereas the opposite side of the structure utilizes a heat-sealable FEP layer to impart maximum sealability. However, the laminar structures do not contain a second PTFE/FEP layer nor outer FEP layers, and do not provide adequate arc track resistance.

U.S. Pat. No. 5,106,673, issued on Apr. 21, 1992, discloses a multi-layer laminar structure having improved adhesion and arc-tracking comprising a polyimide base layer, layers of PTFE/FEP blend adhered to both sides of the polyimide base layer and outer layers of PTFE adhered to both inner PTFE/FEP blend layers. The patent specifically teaches that blends of PTFE and FEP provide greater adhesion than FEP alone when used to bond the polyimide base layer and the outer PTFE layers. In contrast, the laminar structures of the present invention use a FEP layer and not a PTFE/FEP blend layer to bond the polyimide to a PTFE/FEP layer. An additional FEP coating also provides excellent film-to-film adhesion during the wrapping and heat-sealing process, as well as good strippability from the conductor.

Thus, a need still exists for a polyimide-fluoropolymer laminar structure which is both self-bonding and bondable to other insulation materials, has arc track propagation resistance and is strippable from the wire conductor while still retaining adequate adhesion to the conductor.

SUMMARY OF THE INVENTION

According to the present invention, there is provided a laminar film structure consisting essentially of a core layer of a polyimide film; inner layers of a fluorinated ethylenepropylene copolymer (FEP) bonded to both sides of said polyimide core layer; intermediate layers of a blend of polytetrafluoroethylene (PTFE) and a fluorinated ethylenepropylene copolymer (FEP) bonded to both of said inner FEP layers; and outer layers of fluorinated ethylenepropylene copolymer (FEP) bonded to both of said intermediate PTFE-FEP blend layers.

Laminar structures wherein the PTFE-FEP blend layer comprises from 40 to 95% by weight of PTFE and from 5 to 60% by weight of FEP are particularly preferred.

Insulation tapes for wire and cable made using these laminar structures are particularly useful in aerospace applications, since they do not suffer the drawbacks of similar prior art compositions.

DETAILED DESCRIPTION OF THE INVENTION

The laminar structures of the present invention find special use in insulating wires or cables of electrical conductors wherein the structure is wrapped around the wire and is then heat-sealed to yield a continuous coating.

The laminar structures of the invention are prepared by coating a polyimide film, which serves as the core layer, on both sides with an inner fluorinated ethylenepropylene copolymer (FEP) adhesive layer; coating both inner adhesive layers with an intermediate layer of a blend of polytetrafluoroethylene (PTFE) and fluorinated ethylenepropylene copolymer (FEP); coating both intermediate PTFE-FEP layers with an outer layer of FEP copolymer; and finally heat-sealing the successive layers to form a composite structure.

The polyimide film used as the core layer is derived from the reaction of an aromatic tetracarboxylic dianhydride and an aromatic and/or aliphatic diamine and contains the following recurring structural unit:

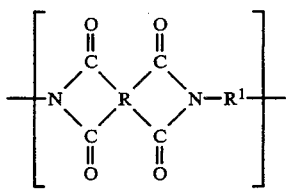

wherein R is a tetravalent aromatic organic radical and $R^1$ is a divalent aromatic and/or aliphatic diamine radical. Such polyimides and their poly(amic acid) precursors are more fully described in U.S. Pat. Nos. 3,179,164 and 3,179,634 which are incorporated herein by reference. A particularly preferred polyimide film is derived from pyromellitic dianhydride and 4,4'-diaminodiphenyl ether.

The polyimide film layer must be thick enough to provide adequate electrical insulation properties and film strength, but yet must be thin enough to be flexible and mold closely to the articles wrapped by the structure. For most uses, the thickness of the polyimide film layer ranges from 0.30 to 5.0 mils, preferably from 0.70 to 3.0 mils.

The fluorinated ethylenepropylene copolymer (FEP) is conveniently applied to both sides of the polyimide film core layer as an aqueous dispersion. More specifically, the FEP copolymer is applied to both sides of the polyimide film as a layer having a thickness of from 0.02 to 0.15 mil, preferably from 0.03 to 0.06 mil, as an aqueous dispersion of a colloidal FEP polymer, and then the coated film is heated at a temperature of from 325° to 450° C., preferably from 370° to 450° C. for from 0.25 to 5 minutes. The layer of FEP is preferably a copolymer of from 50% to 95% of tetrafluoroethylene and from 5% to 50%, preferably 7 to 27%, of hexafluoropropylene. The FEP copolymers are extensively described in U.S. Pat Nos. 2,833,686 and 2,946,763.

The FEP inner coating provides excellent bonding of the polyimide film core layer to the subsequently applied intermediate PTFE/FEP blend layers. Without the FEP primer coating, the PTFE/FEP blend layers do not bond very well to the polyimide core layer, unless the proportion of FEP in the blend is at least about 50%. However, the FEP primer coating used according to the invention provides excellent bonding of the intermediate PTFE/FEP blend coating, even when the PTFE/FEP copolymer blend ratio is as much as 90/10.

The PTFE/FEP blend is subsequently applied to both of the FEP layers as a colloidal aqueous dispersion having a solids content of from 5 to 60% and the coated film is heated at from 350° to 500° C. for from 0.50 to 5 minutes. The thickness of the intermediate PTFE/FEP layers ranges from 0.10 to 0.90 mil, preferably from 0.20 to 0.85 mil. In practice, the preferred thickness depends on the required wire specifications used for military or commercial aircraft applications. In order to achieve superior arc track resistance and thermal resistance, the PTFE/FEP blend must contain at least 40 weight %, and preferably up to 95 weight % of the PTFE homopolymer. A highly preferred PTFE/FEP blend consists of from 50 to 90% by weight PTFE homopolymer and from 10 to 50% by weight of FEP copolymer. The PTFE homopolymer used herein is commercially available from several sources as Teflon ® 30 (from E. I. du Pont de Nemours & Company), AD ® 1 (from ICI Americas, Inc.) and Algoflon ® 60 (from Daikin Industries Ltd.). The FEP copolymer is commercially available as Teflon ® TE-5582, Teflon ® TE-9503, Teflon ® 120 and Teflon ® TE-322J (from E. I. du Pont de Nemours & Company).

Outer layers of FEP copolymer are used to bond the laminar structure to itself during the tape overlapping which occurs during the taping of the conductor. The overlap is generally 50%, or greater, of the tape width. The outer FEP layers also bond to other insulation materials required in the wire construction. For example, other insulation materials used in typical wire constructions include sintered or unsintered PTFE fluoropolymer tapes, and the FEP outer layers adhere well to such PTFE tapes. The outer FEP copolymer layers have a thickness ranging from 0.02 to 0.15 mil, preferably from 0.03 to 0.06 mil. The outer FEP copolymer layers used in the laminar structures of the invention also facilitate stripping of the insulation from the electrical conductor when used in commercial applications.

The ratio of the total fluoropolymer layer thickness (i.e. inner FEP layer, intermediate PTFE/FEP layer and outer FEP layer) on each side of the polyimide core layer ranges from 0.2:1 to 1.5:1, preferably from 0.25:1 to 0.50:1.

The laminar film structure of the invention is useful for electrical insulation purposes. The structures are preferably slit into narrow widths to provide tapes. The tape is wound around the electrical conductor in spiral fashion and overlapped on itself. The amount of overlap can vary, depending on the angle of wrap. The tension employed during the wrapping operation can also vary widely ranging from just enough tension to prevent wrinkling to a tension high enough to stretch and neck down the tape. Even when the tension is low, a snug wrap results since the tape shrinks to a certain extent under the influence of heat during the ensuing heat-sealing operation. Heat-sealing of the tape is accomplished by treating the tape-wrapped conductor at a temperature and for a time sufficient to fuse the outer FEP copolymer layers of the structure. The heat-sealing temperature required can range from 240° to 500° C., depending on the insulation thickness, the gauge of the metal conductor, the speed of the production line and the length of the sealing oven.

The utility of the laminar film structures of the invention is, in general, similar to that of other well-known polyimide films. For example, tapes of the laminar film structures of various widths are useful as insulation when wrapped on electrical wire and cable. The film being heat-sealable, the tape can be sealed in place after wrapping and is especially useful for wire and cable, which must resist exposure to high temperature stress.

The principle and practice of the present invention will now be illustrated by the following examples which are provided to illustrate the practice and use thereof.

EXAMPLE 1

A 1 mil thick polyimide film derived from pyromellitic dianhydride and 4,4'-diaminodiphenylether (sold by E. I. du Pont de Nemours & Company under the trademark Kapton ® HN) was coated on both sides with a 10 weight % aqueous dispersion of an FEP copolymer containing 12 weight % of hexafluoropropylene and 88 weight % of tetrafluoro-ethylene (sold by E. I. du Pont de Nemours & Company under the trademark Teflon ® FEP). The FEP dispersion was metered onto the polyimide film using a wire wound applicator rod, and the coated film was then heated in a seven-zone radiant heated, air-circulated oven which was temperature ramped from 190° C. to 432° C. A 0.01 to 0.04 mil thick FEP coating was obtained on both sides of the polyimide film.

The FEP-coated polyimide film was then coated with a 42 weight % aqueous dispersion of a blend of 90 weight % of PTFE (sold by E. I. du Pont de Nemours & Company under the trademark Teflon ® PTFE) and 10 weight of FEP copolymer (Teflon ® FEP) and heated at 190° C. to 432° C. to provide a coating having a thickness of 0.50 mil on both sides of the FEP-coated polyimide film (hereinafter referred to as Example 1A - Control).

The bond strength of the laminar structure was measured using a robotic jaw type heat sealer having a ¾-inch sealing bar. Two surfaces of the film structure were sealed together in the jaws of the heat sealer by heating to 350° C. and 20 psi pressure for 20 seconds. The heat-sealed film was then tested for bond strength in an Instron tensile tester by pulling the films apart at a 180 degree angle. The bond strength of the PTFE/FEP side-to-the PTFE/FEP side measured 3.3 to 4.4 pli, thereby illustrating good adhesion between the fluoropolymer layers and also to the polyimide layer.

The above laminar structure was then coated on both sides with a 20 weight % aqueous dispersion of FEP copolymer (Teflon ® FEP), and the coated film was dried and coalesced, as previously described above, to provide an FEP coating having a thickness of from 0.07 to 0.3 mil on both of the PTFE/FEP layers (hereinafter referred to as Example 1). The bond strength of the FEP side-to-the FEP side was greater than 3.1 pli.

EXAMPLE 2

Many wire constructions for both military and commercial aircraft applications require that electrical insulation tapes be used in conjunction with additional PTFE tapes. To illustrate bonding effectiveness, tapes of the laminar structures of Example 1 and Example 1A (Control) were bonded directly to unsintered PTFE Tape #3579 (obtained from the Garlock Inc., Plastomer Products) using the robotic heat sealer at 300° C. and 1 psi pressure for 5 seconds. Bond failure occurred as follows:

| Tapes Bonded | Bond Failure |
| --- | --- |
| Example 1A (Control) without FEP outer layers bonded to PTFE tape | Adhesive - between PTFE/FEP and PTFE tape surfaces |
| Example 1 with FEP outer layers bonded to PTFE tape | Cohesive - within PTFE tape |

Thus, maximum bond strength to adjoining PTFE tapes was obtained by using outer FEP copolymer layers in the laminar structures.

EXAMPLE 3

To illustrate the bonding of tapes both with and without FEP copolymer outer layers, i.e. Example 1 and Example 1A (Control) respectively, heat-seals were made of each tape to itself and also of the Example 1 tape to the Example 1A (Control) tape. The heat-seals were made using the jaw sealer at 300° C., as previously described. The heat-seal strengths were as follows:

| Tape-to-Tape Bond | Bond Strength (pli) (Sealing Temperature 300° C.) |
| --- | --- |
| Example 1A (Control) to itself | 0.62 |
| Example 1A (Control) to Example 1 | 2.11 |
| Example 1 to itself | 4.42 |

The results clearly show the improvement in bond strength obtained when a FEP copolymer was used as one of the tape bonding surfaces.

EXAMPLE 4

In order to illustrate the bonding of the tapes of Example 1 and Example 1A (Control) to a metallic conductor, both tapes were heat-sealed to a 1 ounce copper foil using the robotic jaw sealer at 350° C. and 20 psi pressure for 20 seconds. The following results show the necessity of having an outer coating of FEP copolymer to provide sufficient bonding of the laminar structure to the conductor.

| Tape Bonded to Copper Foil | Bond Strength (pli) |
| --- | --- |
| Example 1A (Control) | 0.52 |
| Example 1 (0.04 mil coating) | 1.32 |
| Example 1 (0.10 mil coating) | 2.37 |

EXAMPLE 5

A ¼-inch wide tape of both Example 1 and a commercial polyimide/fluoropolymer film tape (a 2 mil #2919-White tape available from Chemical Fabrics Corporation) were separately wrapped on lengths of #20 (American Wire Gauge) nickel plated copper conductor using a commercial wire wrapper available from E.J.R. Engineering and Machine Co. The #2919 tape was believed to consist of a polyimide base film coated with a mixture of PTFE homopolymer and FEP copolymer, whereas the laminar structure of Example 1 had outer layers of FEP copolymer. A 2 mil PTFE tape (Garlock Inc.) was then wrapped over both tapes with an overlap of about 50%. Both tapes were sealed over the wire by passing the wrapped wires through an oven heated at 480° C. to 485° C.

The stripping force of the two laminar insulations was measured on an Instron tensile tester in the following manner. The insulation was removed from one end of the insulated wire. The length of the bared conductor was just enough to enable it to be firmly grasped by one of the pairs of jaws of the tensile tester. The other end of the insulated wire was cut off to leave a 1-inch length of undisturbed insulation. The bare end was inserted through a hole in a 1/32-inch metal plate having a diameter of 0.002 to 0.005 inch larger than the diameter of the metal conductor. The plate was mounted in a supporting yoke which held the plate perpendicular to the direction of pull in the tester. The yoke was clamped in one pair of jaws of the tester and the bare conductor in the other pair of jaws. The wire specimen was pulled through the hole of the plate at a rate of from 20 inches/minutes. The stripping force for Example 1 was 1.04 lbs., whereas the stripping force for the #2919 commercial tape was 9.95 lbs., thereby showing that the strippability of the polyimide/fluoropolymer tape of the invention was much superior to that of the commercial polyimide/fluoropolymer tape.

What is claimed is:

1. A laminar film structure consisting essentially of a core layer of a polyimide film; inner layers of a fluorinated ethylenepropylene copolymer (FEP) bonded to both sides of said polyimide core layer; intermediate layers of a blend of polytetrafluoroethylene (PTFE) and a fluorinated ethylenepropylene copolymer (FEP) bonded to both of said inner FEP layers; and outer layers of fluorinated ethylenepropylene copolymer (FEP) bonded to both of said intermediate PTFE-FEP blend layers.

2. The laminar film structure of claim 1 wherein the polyimide film is derived from pyromellitic dianhydride and 4,4'-diaminodiphenyl ether.

3. The laminar film structure of claim 2, wherein said intermediate PTFE and FEP blend layers comprise from 40% to 95% by weight of PTFE homopolymer and from 5% to 60% by weight of FEP copolymer.

4. The laminar film structure of claim 2 wherein said FEP copolymer inner layers comprise from 50% to 90% by weight of tetrafluoroethylene and from 10% to 50% by weight of hexafluoropropylene.

5. The laminar film structure of claim 2 wherein said FEP copolymer outer layers comprise from 50% to 90% by weight of tetrafluoroethylene and from 10% to 50% by weight of hexafluoropropylene.

6. The laminar film structure of claim 3 wherein said intermediate PTFE and FEP blend layers comprise 90% by weight of PTFE homopolymer and 10% by weight of FEP copolymer.

7. The laminar film structure of claim 2 wherein said polyimide film layer has a thickness of from 0.30 to 5.0 mils.

8. The laminar film structure of claim 4 wherein said FEP copolymer inner layers have a thickness of from 0.02 to 0.15 mil.

9. The laminar film structure of claim 5 wherein said FEP copolymer outer layers have a thickness of from 0.02 to 0.15 mil.

10. The laminar film structure of claim 3 wherein said intermediate PTFE and FEP blend layers have a thickness of from 0.10 to 0.90 mil.

11. The laminar film structure of claim 1 wherein the ratio of the total fluoropolymer layer thickness on each side of the polyimide core layer to the thickness of the polyimide core layer ranges from 0.2:1 to 1.5:1.

12. The laminar film structure of claim 11 wherein the ratio of said total fluoropolymer layer thickness to said polyimide core layer thickness ranges from 0.25:1 to 0.50:1.

13. An insulated wire or cable spirally wrapped by at least one strip of a laminar film structure consisting essentially of a core layer of a polyimide film; inner layers of a fluorinated ethylenepropylene copolymer (FEP) bonded to both sides of said polyimide core layer; intermediate layers of a blend of polytetrafluoroethylene (PTFE) and a fluorinated ethylenepropylene copolymer (FEP) bonded to both of said inner FEP layers; and outer layers of fluorinated ethylenepropylene copolymer (FEP) bonded to both of said intermediate PTFE-FEP blend layers; wherein the edges of said strip of laminar film structure overlap and said strip is heat-sealed at the overlapped edges.

14. The insulated wire or cable of claim 13 wrapped with a laminar film structure wherein the polyimide film is derived from pyromellitic dianhydride and 4,4'-diaminodiphenyl ether.

15. The insulated wire or cable of claim 14 wrapped with a laminar film structure wherein said intermediate PTFE and FEP blend layers comprise from 40% to 95% by weight of PTFE homopolymer and from 5% to 60% by weight of FEP copolymer.

16. The insulated wire or cable of claim 14 wrapped with a laminar film structure wherein said FEP copolymer inner layers comprise from 50% to 90% by weight of tetrafluoroethylene and from 10% to 50% by weight of hexafluoropropylene.

17. The insulated wire or cable of claim 14 wrapped with a laminar film structure wherein said FEP copolymer outer layers comprise from 50% to 90% by weight of tetrafluoroethylene and from 10% to 50% by weight of hexafluoropropylene.

* * * * *